United States Patent
Itozawa et al.

(10) Patent No.: US 8,401,139 B2
(45) Date of Patent: Mar. 19, 2013

(54) DATA TRANSFER UNIT, DATA TRANSMISSION DEVICE, DATA RECEIVING DEVICE, AND CONTROL METHOD

(75) Inventors: Shintaro Itozawa, Kawasaki (JP); Hiroshi Nakayama, Kawasaki (JP); Junji Ichimiya, Kawasaki (JP); Daisuke Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 14 days.

(21) Appl. No.: 13/137,670

(22) Filed: Sep. 1, 2011

(65) Prior Publication Data

US 2011/0309868 A1    Dec. 22, 2011

Related U.S. Application Data

(63) Continuation of application No. PCT/JP2009/054082, filed on Mar. 4, 2009.

(51) Int. Cl.
    *H04L 7/00*      (2006.01)
(52) U.S. Cl. ........................................................ 375/371
(58) Field of Classification Search .................. 375/371, 375/373, 376, 354, 326, 327
    See application file for complete search history.

(56) References Cited

U.S. PATENT DOCUMENTS

| | | | |
|---|---|---|---|
| 4,694,472 A * | 9/1987 | Torok et al. .................... | 375/354 |
| 5,621,774 A * | 4/1997 | Ishibashi et al. ............. | 375/371 |
| 7,460,630 B2 | 12/2008 | Kato et al. | |
| 2001/0056332 A1 | 12/2001 | Abrosimov et al. | |
| 2004/0223566 A1 | 11/2004 | Yamashita | |
| 2007/0050658 A1 | 3/2007 | Kuwata | |
| 2008/0181348 A1 * | 7/2008 | Best et al. ..................... | 375/376 |

FOREIGN PATENT DOCUMENTS

| | | |
|---|---|---|
| JP | 10-164037 | 6/1998 |
| JP | 2004-501554 | 1/2004 |
| JP | 2004-236019 | 8/2004 |
| JP | 2006-50102 | 2/2006 |
| JP | 2007-60217 | 3/2007 |
| WO | 2010/100730 A1 | 9/2010 |

OTHER PUBLICATIONS

International Search Report for PCT/JP2009/054082 mailed Mar. 31, 2009.

* cited by examiner

*Primary Examiner* — Kevin Kim
(74) *Attorney, Agent, or Firm* — Staas & Halsey LLP

(57) ABSTRACT

A transmission LSI calculates a buffer usage rate in accordance with data stored in a buffer in a transmission data processing unit and determines, in accordance with the calculated buffer usage rate, the number of signal lines that perform a phase readjustment and the timing thereof. Then, the transmission LSI and a receiving LSI perform a phase adjustment using some of the signal lines and continues a data transfer using the rest of the signal lines. Accordingly, it is possible to maintain the optimum phase of a clock without delaying the data transfer.

8 Claims, 15 Drawing Sheets

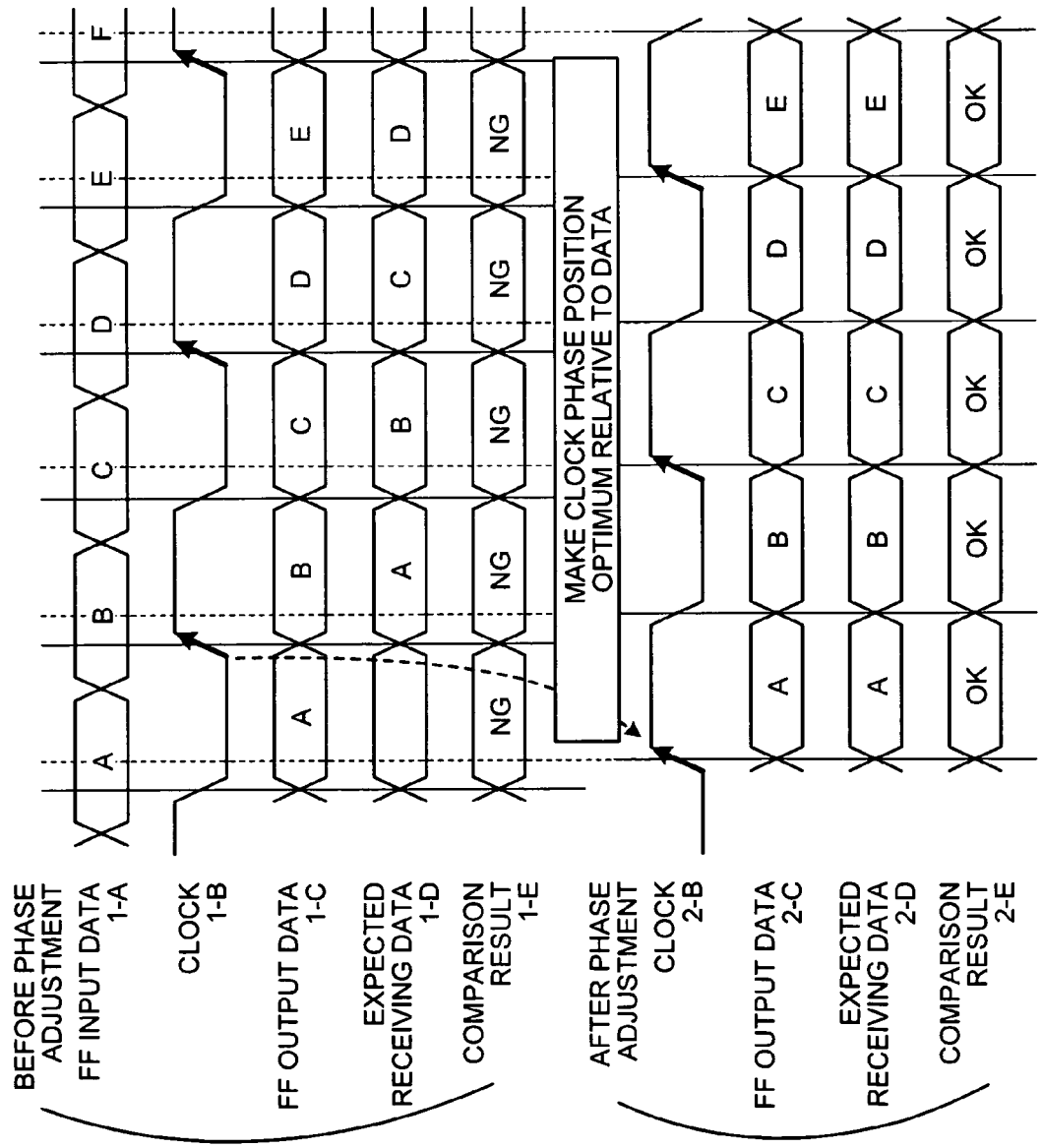

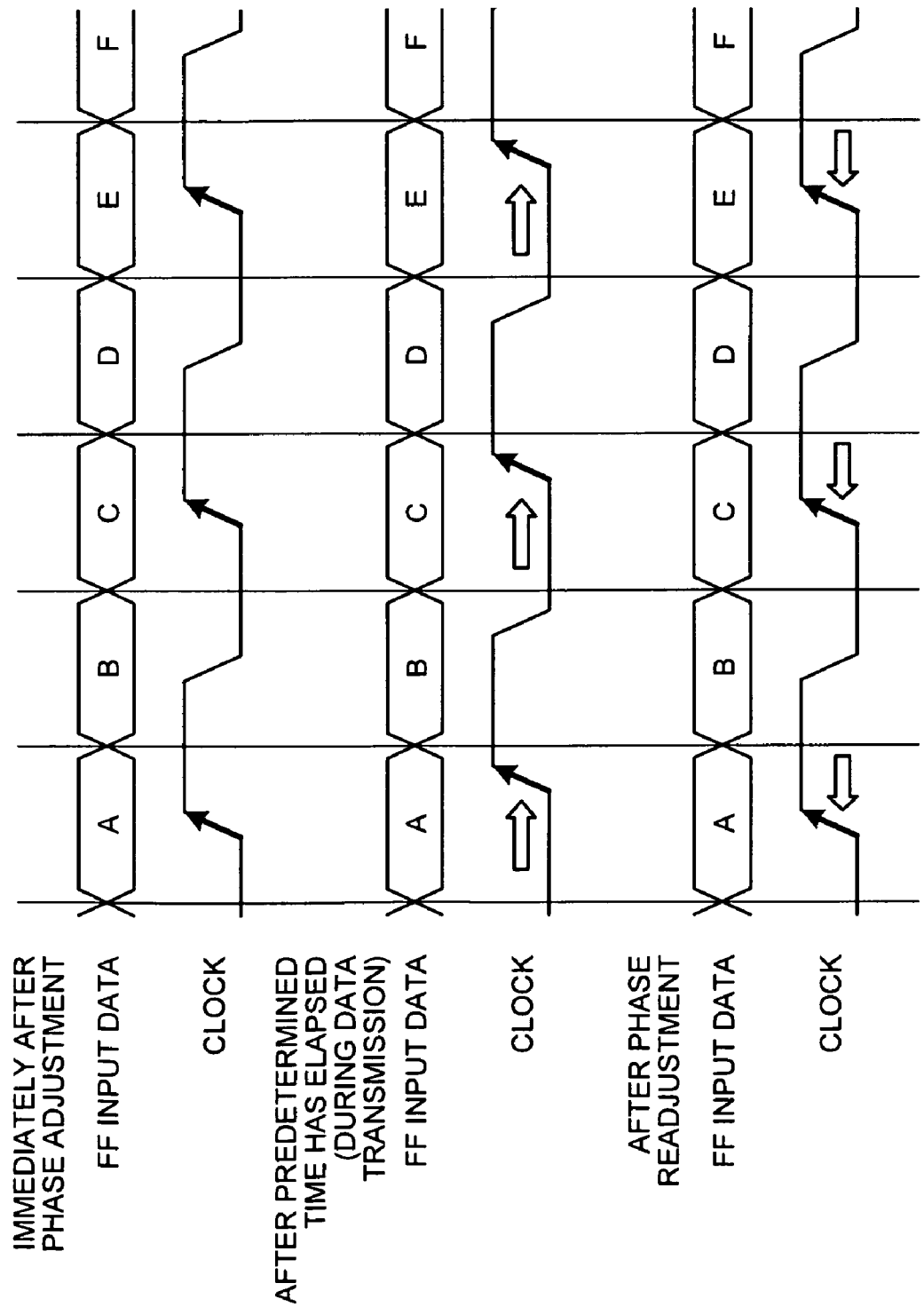

DATA TRANSFER UNIT, DATA TRANSMISSION DEVICE, DATA RECEIVING DEVICE, AND CONTROL METHOD

CROSS-REFERENCE TO RELATED APPLICATION

This application is a continuation of International Application No. PCT/JP2009/054082, filed on Mar. 4, 2009, the entire contents of which are incorporated herein by reference.

FIELD

The embodiment discussed herein is directed to a data transfer unit, a data transmission device, a data receiving device, and control method.

BACKGROUND

FIG. 10 is a schematic diagram illustrating the configuration of a conventional system. As illustrated in FIG. 10, the system includes system boards 10a and 10b, IO boards 20a and 20b, a crossbar 30, and a system management device 40. The system boards 10a and 10b each include central processing units (CPUs), a memory, and a system control circuit that controls, for example, data communication with another large scale integration (LSI). The system boards 10a and 10b are connected to the crossbar 30 and perform data communication with, for example, the IO boards 20a and 20b, respectively.

The IO boards 20a and 20b each include an IO control circuit that controls, for example, data communication with another LSI. The IO boards 20a and 20b are connected to the crossbar 30 and perform data communication with, for example, the system boards 10a and 10b, respectively. When the system boards 10a and 10b and the IO boards 20a and 20b perform data communication, a device that transmits data and a device that receives data adjust the phase of a clock (see, Patent Document 1). In the following description, the device that transmits data is referred to as a transmission LSI and the device that receives data is referred to as a receiving LSI.

The system management device 40 is connected to the transmission LSI and the receiving LSI (e.g., the system control circuits and the IO control circuits), controls the operation timing of the phase adjustment of the clock performed in each control circuit, collects a log of errors occurring in each LSI, and the like.

The transmission LSI and the receiving LSI respectively transmit data to and receive data from each other at high speed using signals with various bit widths. FIG. 11 is a schematic diagram illustrating the connection relation between the transmission LSI and the receiving LSI. As illustrated in FIG. 11, a transmission LSI 50 and a receiving LSI 60 are connected by N signal lines (N is a positive integer). Specifically, the transmission LSI 50 and the receiving LSI 60 perform data communication using an N-bit transmission path. When performing the phase adjustment as a preparation for the data transfer, the receiving LSI 60 performs the phase adjustment by receiving both a data pattern and a clock that are transmitted from the transmission LSI 50.

FIG. 12 is a schematic diagram illustrating the configuration of the conventional transmission LSI 50 and the conventional receiving LSI 60. As illustrated in FIG. 12, the transmission LSI 50 includes a degeneracy processing unit 51, a transmission data processing unit 52, a pattern creating unit 53, a phase adjustment control circuit 54, data selection circuits 55-1 to 55-N, a PLL 56, latches (flip-flop circuits) 57-1 to 57-N, a clock output circuit 58, and data output circuits 59-1 to 59-N.

The receiving LSI 60 includes a clock input circuit 61, data input circuits 62-1 to 62-N, latches (flip-flop circuits) 63-1 to 63-N, phase adjustment circuits 64-1 to 64-N, phase adjustment control circuits 65-1 to 65-N, a phase adjustment instruction circuit 66, a degeneracy processing unit 67, and a receiving-data processing unit 68.

In the following description, the configuration of the transmission LSI 50 will be described first and then the configuration of the receiving LSI 60 will be described. The degeneracy processing unit 51 is a processing unit that detects a failure of a signal line connected to the transmission LSI 50 and the receiving LSI 60 and outputs, to the transmission data processing unit 52 as a usage bit selection signal, information on a signal line in which a failure has not occurred.

The transmission data processing unit 52 is a processing unit that obtains a usage bit selection signal and transmits transmission data to a data selection circuit by using a signal line in which a failure has not occurred. If no failure occurs in each of the signal lines 1 to N, the transmission data processing unit 52 transmits transmission data 1 to N to the data selection circuits 55-1 to 55-N, respectively. For example, if a failure occurs in a signal line N-M (M is a positive integer), the transmission data processing unit 52 outputs the corresponding transmission data to a data selection circuit other than the data selection circuit N-M.

The pattern creating unit 53 is a processing unit that creates a training pattern and outputs the created training pattern to the data selection circuits 55-1 to 55-N. The phase adjustment control circuit 54 is a processing unit that outputs a transmission data selection signal to the data selection circuits 55-1 to 55-N when a phase adjustment instruction is received from the system management device 40.

A data selection circuit 55-$j$ ($j$ is a positive integer equal to or greater than one and equal to or less than N; this also applies to j described below) is a circuit that obtains both transmission data and a training pattern and outputs, to a latch 57-$j$ depending on whether a transmission data selection signal is received, the transmission data or the training pattern. Specifically, if the data selection circuit 55-$j$ obtains a transmission data selection signal from the phase adjustment control circuit 54, the data selection circuit 55-$j$ outputs the transmission data to the latch 57-$j$. In contrast, if the data selection circuit 55-$j$ does not receive a transmission data selection signal, it outputs the training pattern to the latch 57-$j$.

The PLL 56 is a device that creates a clock and outputs the created clock to the latches 57-1 to 57-N and the clock output circuit 58. The latch 57-$j$ is a circuit that obtains data (transmission data or a training pattern) in accordance with the rising and the falling of the clock and outputs the obtained data to a data output circuit 59-$j$.

The clock output circuit 58 is a circuit that transmits, to the clock input circuit 61 in the receiving LSI 60, the clock obtained from the PLL 56. The data output circuit 59-$j$ is a circuit that transmits, to a data input circuit 62-$j$ in the receiving LSI 60, data (transmission data or a training pattern) obtained from the latch 57-$j$.

In the following, the configuration of the receiving LSI 60 will be described. The clock input circuit 61 is a circuit that receives a clock from the clock output circuit 58 in the transmission LSI 50 and outputs the received clock to the phase adjustment circuits 64-1 to 64-N.

The data input circuit 62-j is a circuit that receives data (transmission data or a training pattern) from the data output circuit 59-j in the transmission LSI 50 and outputs the received data to a latch 63-j.

The latch 63-j is a circuit that obtains the adjusted clock from a phase adjustment circuit 64-j and, in accordance with the rising and the falling of the clock, outputs, to a phase adjustment control circuit 65-j and the receiving-data processing unit 68, the data obtained from the data input circuit 62-j.

The phase adjustment circuit 64-j is a circuit that adjusts, in accordance with a TAP value (an adjustment value of the phase) obtained from the phase adjustment control circuit 65-j, the phase of the clock obtained from the clock input circuit 61 and outputs the adjusted clock to the latch 63-j.

FIG. 13 is a schematic diagram illustrating an example configuration of the phase adjustment circuit 64-j. As illustrated in FIG. 13, the phase adjustment circuit 64-j includes buffer circuits 64a, a decoder 64b, switches 64c, and capacitors 64d.

By turning on and off the switches 64c in accordance with the TAP value, the decoder 64b changes a load capacity of the path (delay line) passing through the buffer circuits 64a. Accordingly, the amount of delay in the delay line is controlled, and thus the phase of the clock signal varies. As the number of turned-on switches increases, the load capacity increases and thus the amount of delay also increases.

The phase adjustment control circuit 65-j is a circuit that obtains a training pattern from the latch 63-j when obtaining an adjustment instruction from the phase adjustment instruction circuit 66 and determines a TAP value in accordance with the obtained training pattern. FIG. 14 is a schematic diagram illustrating an example configuration of a phase adjustment control circuit. As illustrated in FIG. 14, the phase adjustment control circuit 65-j includes an expected value creating unit 65a, a data comparison unit 65b, and a control unit 65c. The expected value creating unit 65a is a processing unit that creates a training pattern and outputs the created training pattern to the data comparison unit 65b at a predetermined clock timing.

The data comparison unit 65b is a processing unit that sequentially compares the training pattern obtained from the latch 63-j and the training pattern obtained from the expected value creating unit 65a and sequentially outputs the comparison result to the control unit 65c. In the following description, the training pattern obtained from the latch 63-j is referred to as a first training pattern and the training pattern obtained from the expected value creating unit 65a is referred to as a second training pattern.

The control unit 65c is a processing unit that obtains the comparison result from the data comparison unit 65b, determines the TAP value in accordance with the comparison result, and outputs the determined TAP value to the phase adjustment circuit 64-j. For example, if the first training pattern and the second training pattern do not match, the control unit 65c outputs, to the phase adjustment circuit 64-j, a TAP value obtained by adding a predetermined value to the TAP that is previously output. If the first training pattern and the second training pattern do match, the control unit 65c outputs, to the phase adjustment circuit 64-j, a TAP value obtained by subtracting a predetermined value from the previously obtained TAP value.

Refer back to FIG. 12. The phase adjustment instruction circuit 66 is a circuit that outputs the adjustment instruction to the phase adjustment control circuits 65-1 to 65-N when a phase adjustment instruction is received from the system management device 40.

The degeneracy processing unit 67 is a processing unit that detects a failure of the signal line that connects the transmission LSI 50 and the receiving LSI 60 and outputs, to the receiving-data processing unit 68 as a usage bit selection signal, information on a signal line in which a failure has not occurred. The receiving-data processing unit 68 is a processing unit that obtains the usage bit selection signal, receives data transmitted from the signal line in which a failure has not occurred, and performs various processes.

In the following, the phase adjustment of the receiving LSI 60 will be described. FIG. 15 is a schematic diagram illustrating the conventional phase adjustment. In FIG. 15, an FF input data 1-A is a training pattern that is output from the data input circuit 62-j to the latch 63-j. A clock 1-B is a clock that is output, before the phase adjustment, from the phase adjustment circuit 64-j to the latch 63-j.

FF output data 1-C is a training pattern that is output, before the phase adjustment, from the latch 63-j to the phase adjustment control circuit 65-1. Expected receiving data 1-D is a training pattern that is output from the expected value creating unit 65a to the data comparison unit 65b. A comparison result 1-E is data that is output, before the phase adjustment, from the data comparison unit 65b to the control unit 65c.

A clock 2-B is a clock that is output, after the phase adjustment, from the phase adjustment circuit 64-j to the latch 63-j. FF output data 2-C is a training pattern that is output, after the phase adjustment, from the latch 63-j to the phase adjustment control circuit 65-1. A comparison result 2-E is data that is output, after the phase adjustment, from the data comparison unit 65b to the control unit 65c.

As illustrated in FIG. 15, before the phase adjustment, the timing of the rising and the falling of the clock 1-B is shifted from the center of the data waveform of the FF input data 1-A. Accordingly, the FF output data 1-C and the expected receiving data 1-D are shifted, and thus no comparison result can be used.

However, because the receiving LSI 60 adjusts the phase of the clock, the timing of the rising and the falling of the clock 2-B is adjusted to the center of the data waveform of the FF input data 1-A. Accordingly, each timing of the FF output data 2-C and expected receiving data 2-D matches, and thus all of the comparison results can be used. In this way, the preparation of the data transfer is completed; therefore, the receiving LSI 60 can normally receive data from the transmission LSI 50.

Even when the receiving LSI 60 performs the phase adjustment of the clock as described above, because the phase of the clock varies in accordance with an environmental change due to a temperature change or a voltage change, the phase of the clock is not optimum. FIG. 16 is a schematic diagram illustrating a phase change in a clock where the phase change is generated due to an environmental change.

As illustrated in the upper portion of FIG. 16, immediately after the phase adjustment, the timing of the rising and the falling of the clock is adjusted to the center of the data waveform of the FF input data. However, as illustrated in the middle portion of FIG. 16, after a predetermined time has elapsed, the timing of the rising and the falling of the clock is shifted from the center of the data waveform of the FF input data due to an environmental change.

If the timing of the rising and the falling of the clock is shifted from the center of the data waveform of the FF input data, the receiving LSI 60 does not appropriately receive the data; therefore, it is preferable to periodically adjust the phase of the clock even after the data transfer has been started. Accordingly, even after the data transfer has been started, the conventional transmission LSI 50 and the conventional receiving LSI 60 readjust the phase of the clock for a predetermined period of time.

As illustrated in the lower portion of FIG. 16, by readjusting the phase of the clock, the timing of the rising and the falling of the clock is adjusted to the center of the data waveform of the FF input data. If the transmission LSI 50 and the receiving LSI 60 readjust the phase of the clock, they temporarily suspend the data transfer and readjust the phase.

Patent Document 1: Japanese Laid-open Patent Publication No. 2006-050102

However, with the conventional technology, because the phase of the clock is adjusted by suspending the data transfer for a predetermined period of time, the data transfer is temporarily delayed, and thus the data transfer rate is reduced.

If the data transfer rate is reduced, the performance of the entire system, including the transmission LSI 50 and the receiving LSI 60, is reduced. Accordingly, maintaining the optimum phase of a clock without delaying the data transfer is an important factor.

Accordingly, the present invention has been conceived in light of the circumstances described above, and an object thereof is to provide a data transfer unit, a data transmission device, and a data receiving device that can maintain the optimum phase of a clock without delaying the data transfer and a control method of the same.

SUMMARY

According to an aspect of an embodiment of the invention, a data transfer unit includes a data transmission device that transmits data via an N-bit transmission path (N is a positive integer); and a data receiving device that receives the data via the transmission path, wherein the data transmission device includes a clock output unit that outputs a clock, a transfer data creating unit that creates X-bit transmission data (X is a positive integer that satisfies N>X), a phase-adjustment-data creating unit that creates (N−X)-bit phase adjustment data that adjusts, from among N transmission lines included in the N-bit transmission path, a phase between (N−X) transmission lines, and a data output unit that outputs the X-bit transmission data and the (N−X)-bit phase adjustment data as N-bit data in accordance with an output of the clock; and the data receiving device includes a phase adjustment instruction unit that controls a phase adjustment of the data receiving device, a clock input unit that inputs the clock and outputs a received clock, a data input unit that inputs the N-bit data, a transfer data holding unit that holds, from among the N-bit data that is input by the data input unit, the X-bit transmission data, a phase-adjustment-data holding unit that holds, by using a phase adjusted clock, the (N−X)-bit phase adjustment data from among the N-bit data that is input by the data input unit, a phase setting unit that outputs a phase setting value in accordance with the phase adjustment data held by the phase-adjustment-data holding unit and in accordance with a control performed by the phase adjustment instruction unit, and a phase adjustment unit that inputs the received clock and the phase setting value and that outputs a phase adjusted clock in which a phase of the received clock is adjusted in accordance with the phase setting value.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 15 is a schematic diagram illustrating conventional phase adjustment; and FIG. 16 is a schematic diagram illustrating a phase change in a clock where the phase change is generated due to an environmental change.

DESCRIPTION OF EMBODIMENT

Preferred embodiments of a data transfer unit, a data transmission device, a data receiving device, and a control method will be described in detail below with reference to the accompanying drawings. The present invention is not limited to the embodiment described below.

Embodiment

Figure 1:
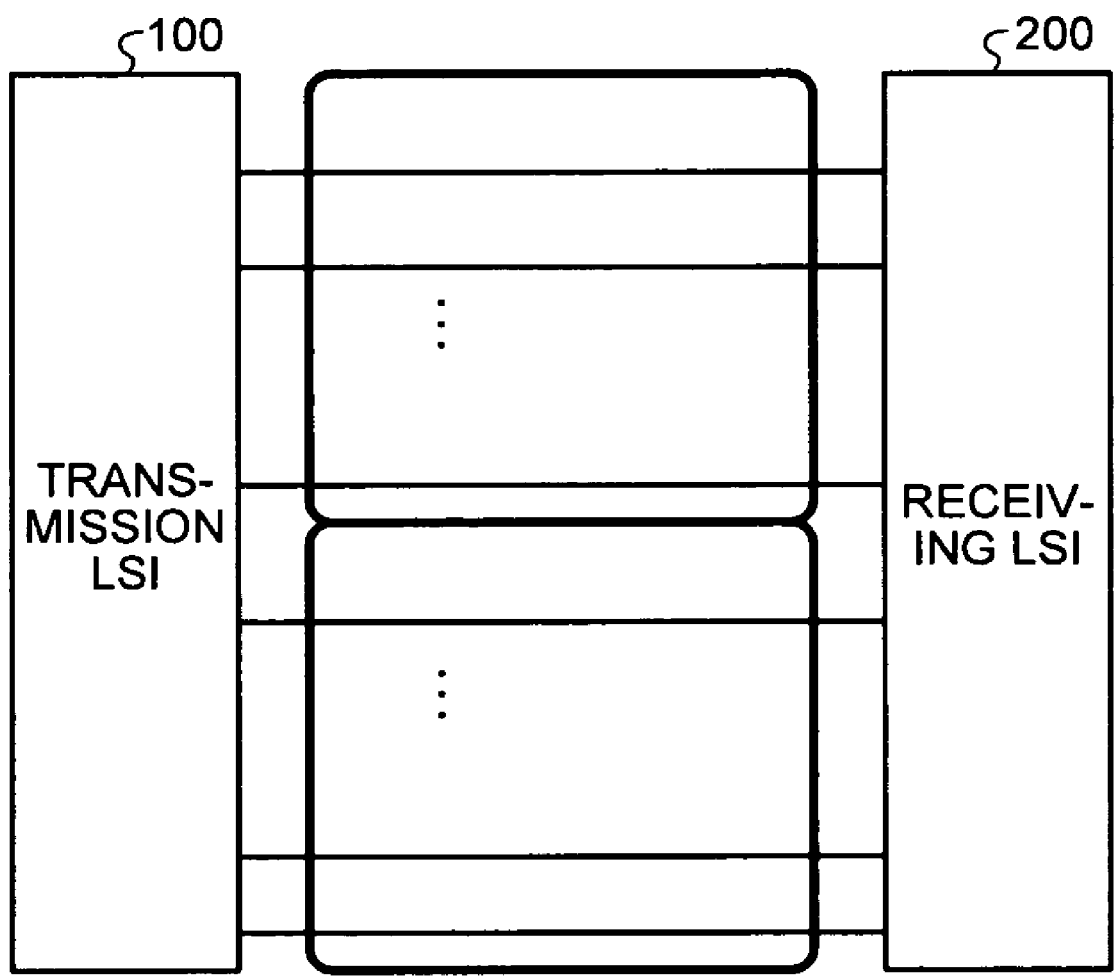
FIG. 1 is a schematic diagram illustrating the outline of a transmission LSI and a receiving LSI according to an embodiment.

First, the outline of a transmission LSI and a receiving LSI according to an embodiment of the present invention will be described. FIG. 1 is a schematic diagram illustrating the outline of a transmission LSI and a receiving LSI according to the embodiment. As illustrated in FIG. 1, a transmission LSI 100 and a receiving LSI 200 according to the embodiment are connected by N signal lines (N is a positive integer).

If a phase adjustment is performed during a data transfer, the transmission LSI 100 and the receiving LSI 200 temporarily use some of the N signal lines for the phase adjustment and use the rest of the signal lines for the data transfer. For example, as illustrated in FIG. 1, the transmission LSI 100 and the receiving LSI 200 continue the data transfer using half the number of signal lines and perform the phase adjustment using the other half of the signal lines. By performing the phase adjustment of the clock using some of the signal lines in this way, it is possible to maintain the optimum phase of a clock without delaying the data transfer.

Figure 2:
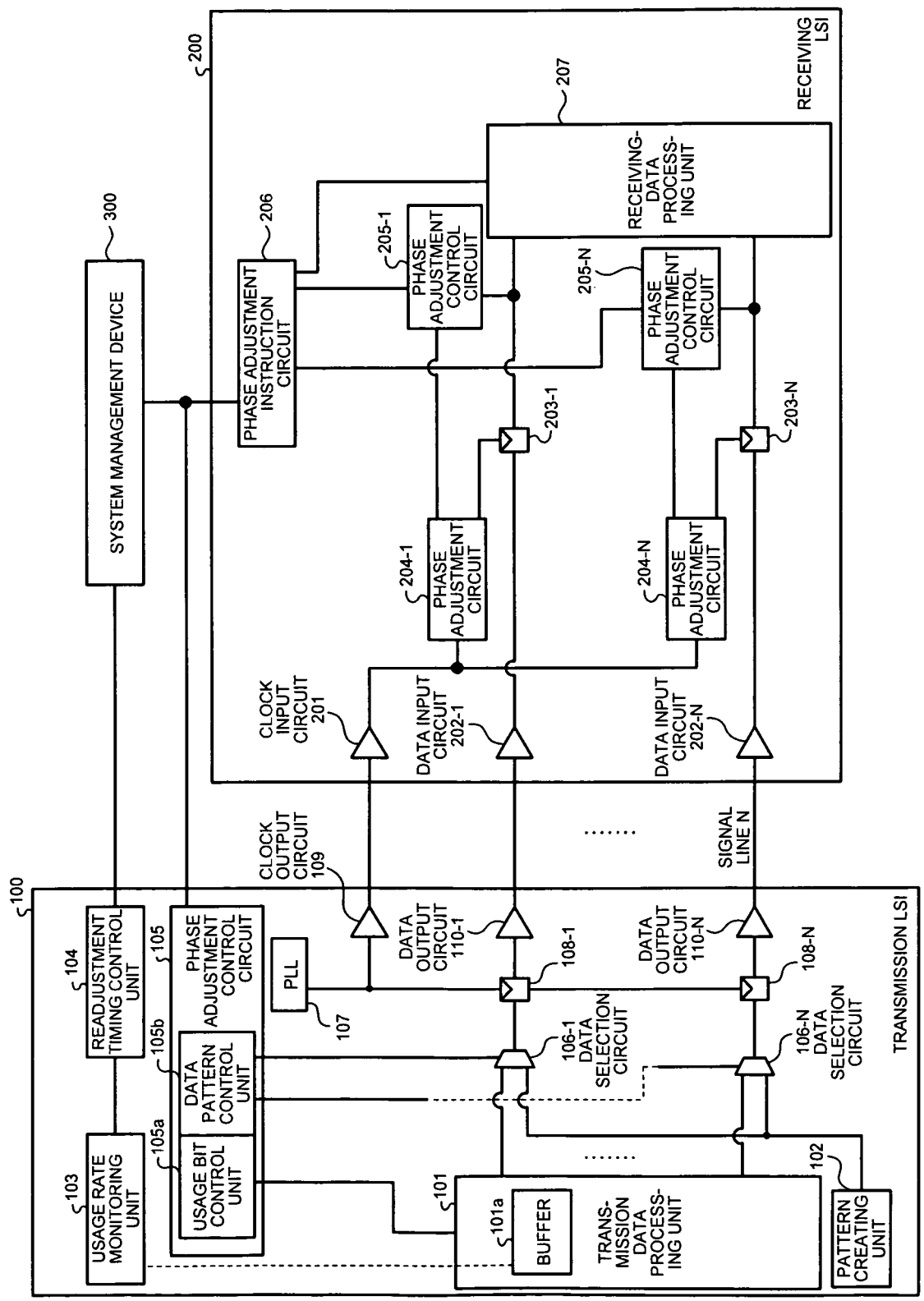
FIG. 2 is a schematic diagram illustrating an example of the configuration of the transmission LSI and of the receiving LSI according to the embodiment.

In the following, the configuration of the transmission LSI 100 and the receiving LSI 200 according to the embodiment will be described. FIG. 2 is a schematic diagram illustrating an example of the configuration of the transmission LSI 100 and of the receiving LSI 200 according to the embodiment. As illustrated in FIG. 2, the transmission LSI 100 and the receiving LSI 200 are connected to a system management device 300.

The transmission LSI 100 includes a transmission data processing unit 101, a pattern creating unit 102, a usage rate monitoring unit 103, a readjustment timing control unit 104, a phase adjustment control circuit 105, data selection circuits 106-1 to 106-N, a PLL 107, latches (flip-flop circuits) 108-1 to 108-N, a clock output circuit 109, and data output circuits 110-1 to 110-N.

The receiving LSI 200 includes a clock input circuit 201, data input circuits 202-1 to 202-N, latches (flip-flop circuits) 203-1 to 203-N, phase adjustment circuits 204-1 to 204-N, phase adjustment control circuits 205-1 to 205-N, a phase adjustment instruction circuit 206, and a receiving-data processing unit 207.

In the following description, the configuration of the transmission LSI 100 will be described first and then the configuration of the receiving LSI 200 will be described. The transmission data processing unit 101 is a processing unit that includes a buffer 101*a* that holds transmission data and outputs the transmission data stored in the buffer 101*a* to a data selection circuit 106.

Furthermore, the transmission data processing unit 101 obtains, at the time of phase adjustment, a usage bit selection signal from the phase adjustment control circuit 105. The usage bit selection signal is information for identifying the data width of the transmission data. The transmission data processing unit 101 determines, in accordance with the usage bit selection signal, a data selection circuit that outputs the transmission data and outputs the transmission data to the determined data selection circuit.

The pattern creating unit 102 is a processing unit that creates a training pattern and outputs the created training pattern to the data selection circuits 106-1 to 106-N.

The usage rate monitoring unit 103 is a processing unit that monitors the buffer usage rate of the buffer 101*a*. For example, the usage rate monitoring unit 103 calculates the buffer usage rate in accordance with both the maximum storage capacity of the buffer 101*a* and the amount of data between a read pointer and a write pointer in the buffer 101*a*. The usage rate monitoring unit 103 periodically calculates the buffer usage rate and outputs the calculated buffer usage rate to the readjustment timing control unit 104.

The readjustment timing control unit 104 is a processing unit that determines, in accordance with both the buffer usage rate and the period of time after the immediately previous phase adjustment, the timing of the phase readjustment and the number of signal lines that are used for the phase readjustment. The readjustment timing control unit 104 outputs, to the system management device 300, the timing of the phase readjustment and the number of signal lines that are used for the phase readjustment.

Figure 3:
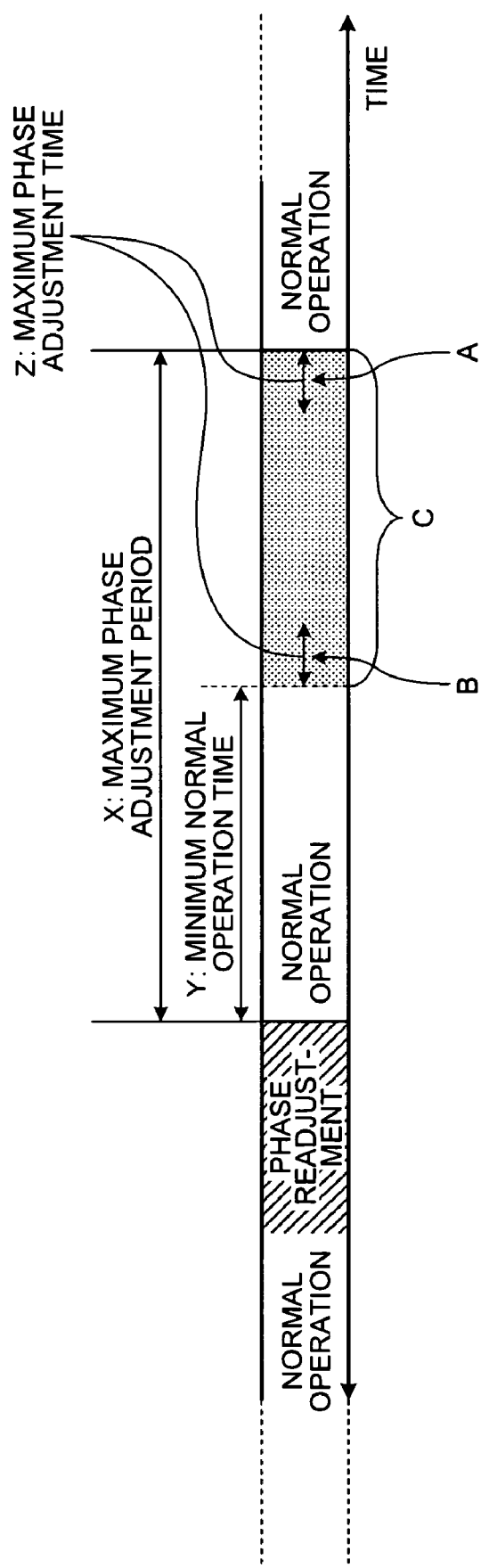
FIG. 3 is a schematic diagram illustrating the readjustment timing.

FIG. 3 is a schematic diagram illustrating the readjustment timing. As illustrated in FIG. 3, to avoid a transmission error, the transmission LSI 100 and the receiving LSI 200 need to perform the subsequent phase adjustment during the maximum phase adjustment period X after the completion of the previous phase adjustment. The readjustment timing control unit 104 sets the minimum normal operation time Y (Y<X) and determines the timing of the phase readjustment that is performed on all of the signal lines, during the maximum phase adjustment period X and after the minimum normal operation time Y has elapsed. The minimum normal operation time mentioned here means the minimum operation time during which the data transfer is performed after the completion of the previous phase adjustment and without the phase adjustment being performed.

In the following, each timing of the phase readjustments will be described. First, a case will be described in which the buffer usage rate is 0% after the minimum normal operation time Y has elapsed since the completion of the previous phase adjustment (e.g., corresponding to B in FIG. 3). In such a case, because performance degradation does not occur even when the data transfer is stopped, the readjustment timing control unit 104 determines to perform the phase adjustment on all of the signal lines and outputs the determination result to the system management device 300.

A case will be described in which the buffer usage rate is 100% when a period of time, from when the minimum normal operation time Y has elapsed after the completion of the previous phase adjustment until the subsequent operation time begins, becomes the maximum phase adjustment time Z (corresponding to A in FIG. 3). The maximum phase adjustment time mentioned here means the maximum period of time until the phase adjustment has been completed. In such a case, the readjustment timing control unit 104 determines to perform the phase adjustment on all of the signal lines and outputs the determination result to the system management device 300.

A case will be described in which the buffer usage rate falls below 100% during a period of time from when the minimum normal operation time Y has elapsed after the completion of the previous phase adjustment until the subsequent operation time begins (corresponding to C in FIG. 3). In such a case, the readjustment timing control unit 104 determines to perform the phase adjustment by using half the number of signal lines and outputs the determination result to the system management device 300.

The phase adjustment control circuit 105 is a circuit that controls the phase adjustment and includes a usage bit control unit 105*a* and a data pattern control unit 105*b*. When the usage bit control unit 105*a* obtains, from the system management device 300, information on both the number of signal lines performing the phase readjustment and the timing of the phase readjustment, the usage bit control unit 105*a* outputs a usage bit selection signal to the transmission data processing unit 101 in accordance with the number of signal lines performing the phase readjustment.

For example, when the phase adjustment is performed using half the number of signal lines, the usage bit control unit 105*a* outputs, to the transmission data processing unit 101, the usage bit selection signal that is used to notify it of the data width "1 to N/2". The transmission data processing unit 101 that has obtained the usage bit selection signal outputs data 1 to N to the data selection circuits 106-1 to 106-N/2.

Then, after a predetermined time has elapsed, the usage bit control unit 105*a* outputs, to the transmission data processing unit 101, the usage bit selection signal that is used to notify it of the data width "N/2+1 to N". The transmission data processing unit 101 that has obtained the usage bit selection signal outputs the data 1 to N to the data selection circuits 106-N/2+1 to 106-N.

When the phase adjustment is performed on all of the signal lines, the usage bit control unit 105a outputs, to the transmission data processing unit 101, the usage bit selection signal that is used to notify it of the data width "1 to N". The transmission data processing unit 101 that has obtained the usage bit selection signal outputs the data 1 to N to the data selection circuits 106-1 to 106-N.

When the data pattern control unit 105b obtains, from the system management device 300, information on both the number of signal lines that perform the phase readjustment and the timing of the phase readjustment, the data pattern control unit 105b outputs the usage bit selection signal to the transmission data processing unit 101 in accordance with the number of signal lines that perform the phase readjustment.

For example, when the phase adjustment is performed using half the number of signal line, the data pattern control unit 105b outputs, first, a transmission data selection signal to the data selection circuits 106-1 to 106+N/2. Then, after a predetermined time has elapsed, the data pattern control unit 105b outputs the transmission data selection signal to the data selection circuits 106-N/2+1 to 106-N. If the phase adjustment is performed on all of the signal lines, the data pattern control unit 105b stops the output of the transmission data selection signal.

A data selection circuit 106-j (j is a positive integer equal to or greater than one and equal to or less than N; this also applies to j described below) is a circuit that obtains both transmission data and a training pattern and outputs, to a latch 108-j depending on whether a transmission data selection signal is received, the transmission data or the training pattern. Specifically, if the data selection circuit 106-j obtains a transmission data selection signal from the data pattern control unit 105b, the data selection circuit 106-j outputs the transmission data to the latch 108-j. In contrast, if the data selection circuit 106-j does not receive a transmission data selection signal, it outputs the training pattern to the latch 108-j.

The PLL 107 is a device that creates a clock and outputs the created clock to the latches 108-1 to 108-N and the clock output circuit 109. The latch 108-j is a circuit that obtains data (transmission data or a training pattern) in accordance with the rising and the falling of the clock and outputs the obtained data to a data output circuit 110-j.

The clock output circuit 109 is a circuit that transmits, to the clock input circuit 201 in the receiving LSI 200, the clock obtained from the PLL 107. The data output circuit 110-j is a circuit that transmits, to a data input circuit 202-j in the receiving LSI 200, data (transmission data or a training pattern) obtained from the latch 108-j.

In the following, the configuration of the receiving LSI 200 will be described. The clock input circuit 201 is a circuit that receives a clock from the clock output circuit 109 in the transmission LSI 100 and outputs the received clock to the phase adjustment circuits 204-1 to 204-N.

The data input circuit 202-j is a circuit that receives data (transmission data or a training pattern) from the data output circuit 110-j in the transmission LSI 100 and outputs the received data to a latch 203-j.

The latch 203-j is a circuit that obtains the adjusted clock from a phase adjustment circuit 204-j and, in accordance with the rising and the falling of the clock, outputs, to a phase adjustment control circuit 205-j and the receiving-data processing unit 207, the data obtained from the data input circuit 202-j.

Figure 13:
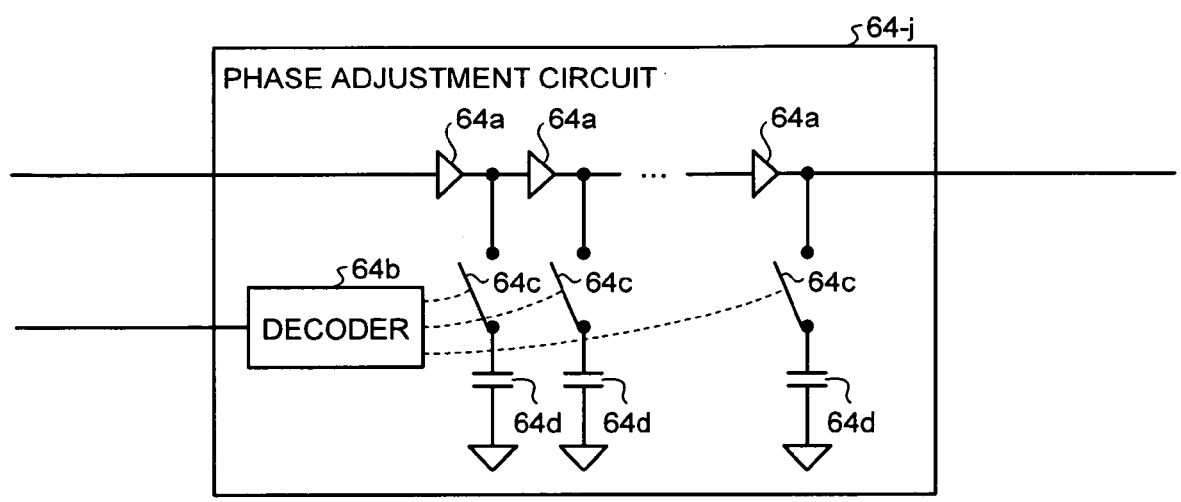
FIG. 13 is a schematic diagram illustrating an example configuration of a phase adjustment circuit.

The phase adjustment circuit 204-j is a circuit that adjusts, in accordance with a TAP value (an adjustment value of the phase) obtained from the phase adjustment control circuit 205-j, the phase of the clock obtained from the clock input circuit 201 and outputs the adjusted clock to the latch 203-j. The configuration of the phase adjustment circuit 204-j is the same as that of the phase adjustment circuit 64-j illustrated in FIG. 13.

Figure 14:
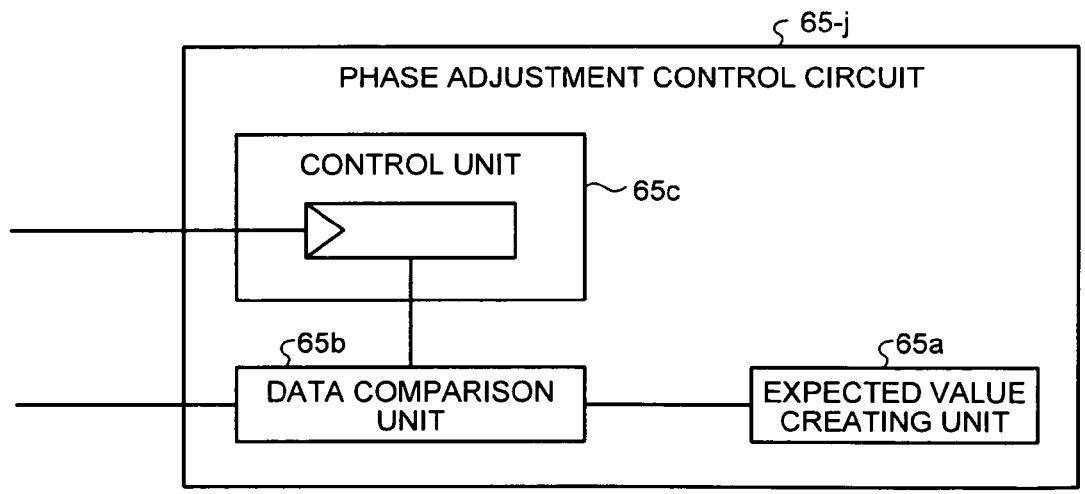
FIG. 14 is a schematic diagram illustrating an example configuration of a phase adjustment control circuit.

The phase adjustment control circuit 205-j is a circuit that obtains a training pattern from the latch 203-j when obtaining an adjustment instruction from the phase adjustment instruction circuit 206 and determines a TAP value in accordance with the obtained training pattern. The configuration of the phase adjustment control circuit 205-j is the same as that of the phase adjustment control circuit 65-j illustrated in FIG. 14.

The phase adjustment instruction circuit 206 is a processing unit that outputs an adjustment instruction to the phase adjustment control circuits 205-1 to 205-N in accordance with the number of signal lines that perform the phase readjustment when the number of signal lines that perform the phase readjustment and the timing of the phase readjustment are received from the system management device 300.

For example, the phase adjustment is performed on half the number of signal lines, the phase adjustment instruction circuit 206 outputs, first, an adjustment instruction to the phase adjustment control circuits 205-N/2+1 to 205-N. Then, after a predetermined time has elapsed, the phase adjustment instruction circuit 206 outputs the adjustment instruction to the phase adjustment control circuits 205-1 to 205-N/2. When the phase adjustment is performed on all of the signal lines, the phase adjustment instruction circuit 206 outputs the adjustment instruction to the phase adjustment control circuits 205-1 to 205-j.

Furthermore, the phase adjustment instruction circuit 206 outputs a usage bit selection signal to the receiving-data processing unit 207 in accordance with the number of signal lines that perform the phase readjustment. For example, when the phase adjustment is performed on half the number of signal lines, the phase adjustment instruction circuit 206 outputs, to the receiving-data processing unit 207, a usage bit selection signal that is used to notify it of the data width "1 to N/2". Then, after a predetermined time has elapsed, the phase adjustment instruction circuit 206 outputs, to the receiving-data processing unit 207, a usage bit selection signal that is used to notify it of the data width "N/2+1 to N".

The receiving-data processing unit 207 is a processing unit that obtains receiving data in accordance with the usage bit selection signal. For example, if the data width contained in the usage bit selection signal is "1 to N/2", the receiving-data processing unit 207 obtains receiving data from the latches 203-1 to 203-N/2. If the data width contained in the usage bit selection signal is "N/2+1 to N", the receiving-data processing unit 207 obtains receiving data from the latches 203-N/2+1 to 203-N.

The system management device 300 is a device that broadcasts, when the timing of the phase readjustment and the number of signal lines at the time of phase readjustment is received from the readjustment timing control unit 104 in the transmission LSI 100, both the obtained timing of the phase readjustment and the obtained number of signal lines to both the transmission LSI 100 and the receiving LSI 200.

Figure 4:
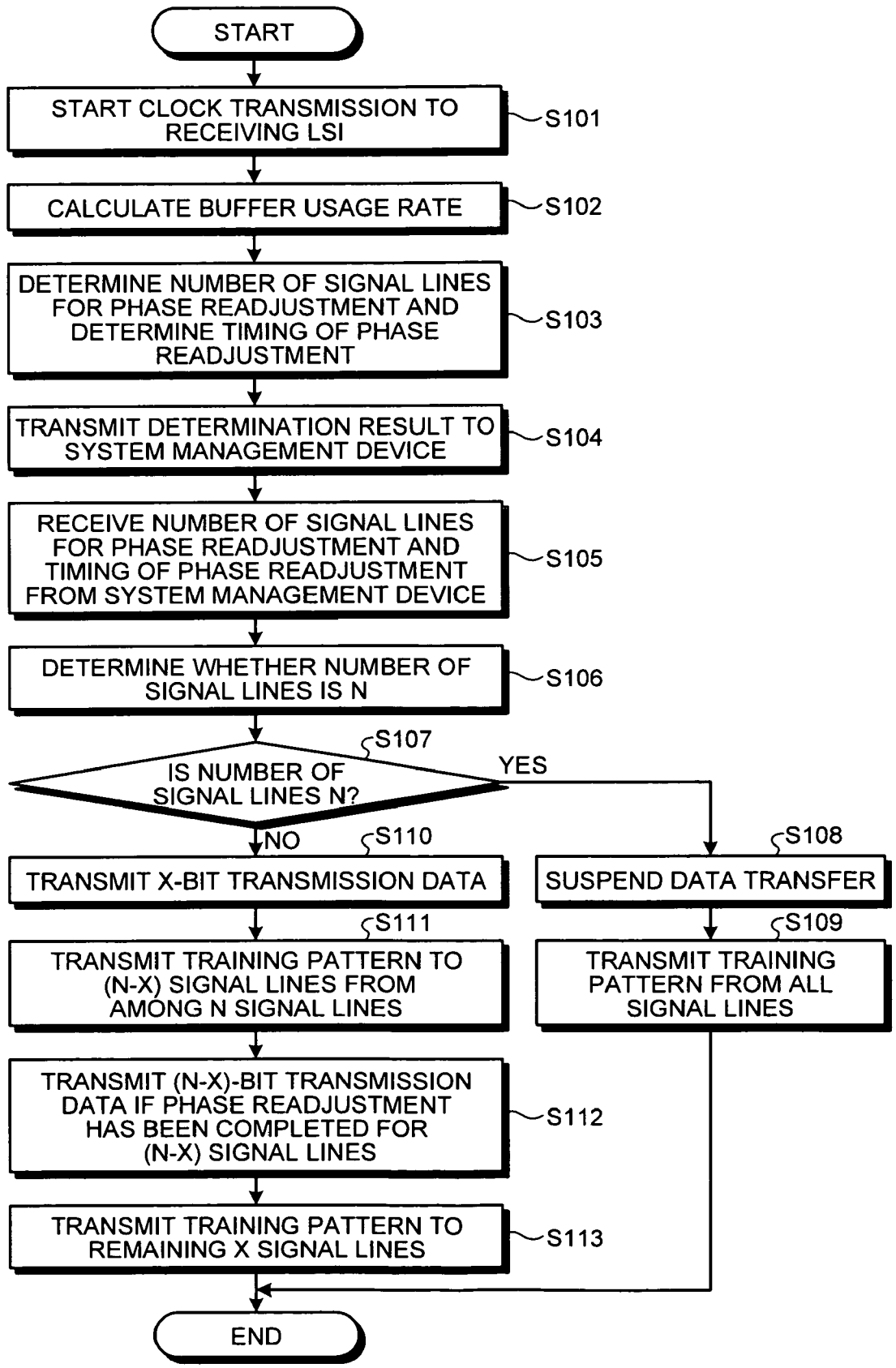
FIG. 4 is a flowchart illustrating the flow of a process performed by the transmission LSI.

In the following, the flow of a process performed by the transmission LSI 100 and the receiving LSI 200 according to the embodiment will be described. FIG. 4 is a flowchart illustrating the flow of a process performed by the transmission LSI 100. As illustrated in FIG. 4, in the transmission LSI 100, the clock output circuit 109 starts transmitting the clock to the receiving LSI 200 (Step S101), and the usage rate monitoring unit 103 calculates the buffer usage rate (Step S102).

The readjustment timing control unit 104 determines the number of signal lines that are used for the phase readjustment and the timing of the phase readjustment in accordance with the buffer usage rate (Step S103) and transmits the determination result to the system management device 300 (Step S104).

The phase adjustment control circuit 105 receives, from the system management device 300, the number of signal lines used for the phase readjustment and the timing of the phase readjustment (Step S105) and determines whether the number of signal lines is N (Step S106).

If the number of signal line used for the phase readjustment is N (Yes at Step S107), the transmission LSI 100 suspends the data transfer (Step S108) and transmits a training pattern from all of the signal lines (Step S109).

In contrast, if the number of signal lines used for the phase readjustment is less than N (No at Step S107), the transmission LSI 100 transmits X-bit transmission data to the receiving LSI 200 (Step S110) and transmits, from among N signal lines, a training pattern to the (N−X) signal lines (Step S111).

Then, if the phase readjustment has been completed for the (N−X) signal lines, the transmission LSI 100 transmits (N−X)-bit transmission data to the receiving LSI (Step S112) and transmits a training pattern to the remaining X signal lines (Step S113).

Figure 5:
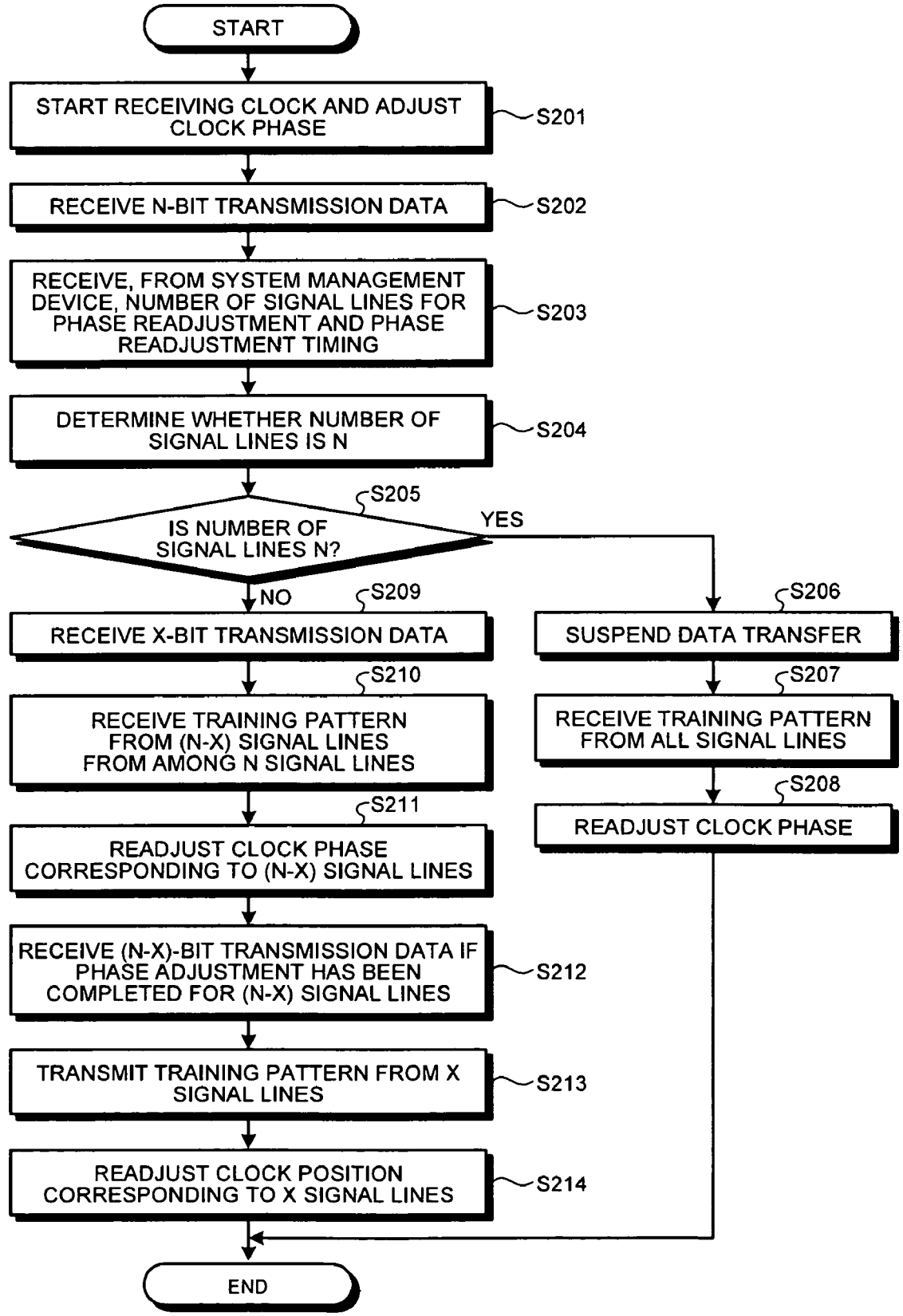
FIG. 5 is a flowchart illustrating the flow of a process performed by the receiving LSI.

FIG. 5 is a flowchart illustrating the flow of a process performed by the receiving LSI 200. As illustrated in FIG. 5, in the receiving LSI 200, the clock input circuit 201 starts receiving the clock, the phase adjustment circuit 204 adjusts the phase of the clock by using the TAP value that is set at the previous phase adjustment (Step S201), and the receiving-data processing unit 207 receives N-bit transmission data (Step S202).

The phase adjustment instruction circuit 206 receives, from the system management device 300, the number of signal lines used for the phase readjustment and the timing of the phase readjustment (Step S203) and determines whether the number of signal lines used for the phase readjustment is N (Step S204).

If the number of signal lines used for the phase readjustment is N (Yes at Step S205), the receiving LSI 200 suspends the data transfer (Step S206), receives a training pattern from all of the signal lines (Step S207), and readjusts the phase of the clock (Step S208).

In contrast, if the number of signal lines used for the phase readjustment is less than N (No at Step S205), the receiving LSI 200 receives X-bit transmission data (Step S209), receives a training pattern from (N−X) signal lines from among N signal lines (Step S210), and readjusts the phase of the clock corresponding to the (N−X) signal lines (Step S211).

Then, if the phase adjustment has been completed for the (N−X) signal lines, the receiving LSI 200 receives (N−X)-bit transmission data (Step S212), transmits a training pattern from X signal lines (Step S213), and readjusts the phase of the clock corresponding to the X signal lines (Step S214).

As illustrated in FIG. 4 and FIG. 5, because the transmission LSI 100 and the receiving LSI 200 perform the phase adjustment of the clock by using some of the signal lines when they readjust the phase, it is possible to maintain the optimum phase of a clock without delaying the data transfer.

Figure 6:
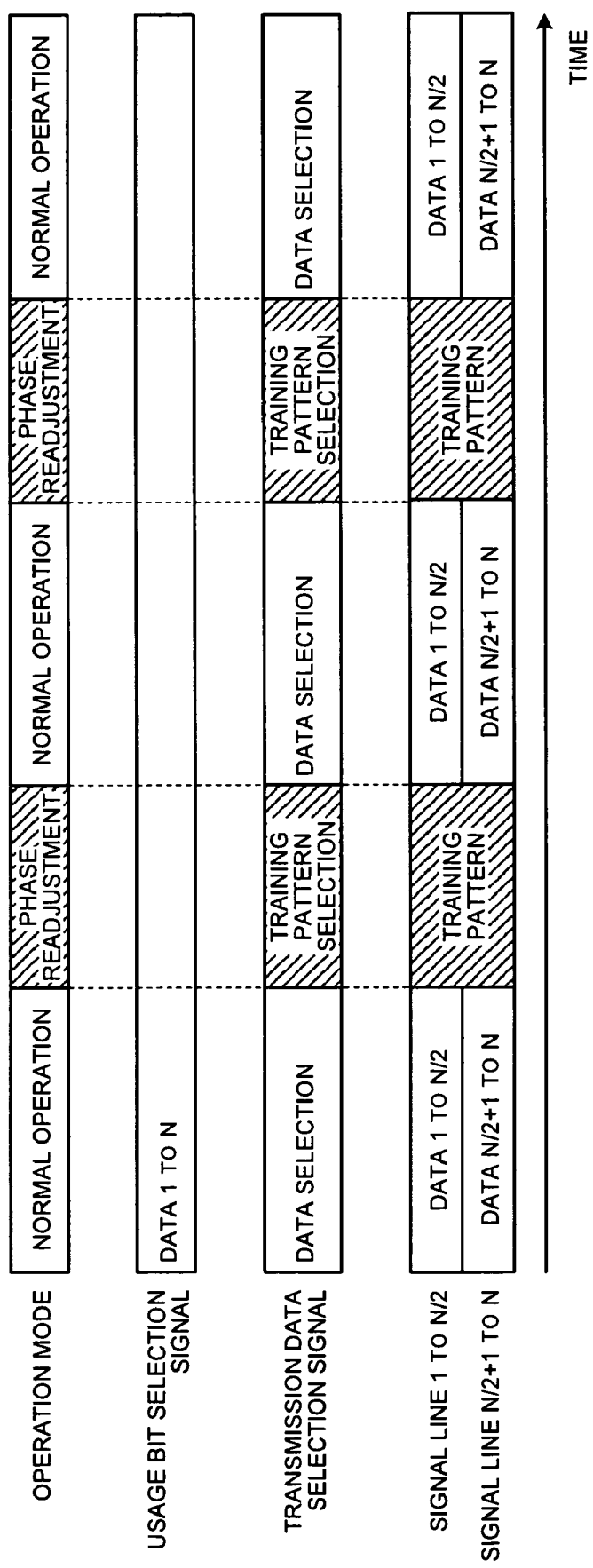
FIG. 6 is a schematic diagram illustrating the state of various signals and the state of data lines 1 to N at the time of normal operation and phase adjustment according to the conventional technology.

In the following, the state of various signals (usage bit selection signals and transmission data selection signals) and data lines 1 to N at the time of normal operation and phase adjustment will be described. FIG. 6 is a schematic diagram illustrating the state of various signals and the state of data lines 1 to N at the time of normal operation and phase adjustment according to the conventional technology.

As illustrated in FIG. 6, in the conventional transmission LSI 50, at the time of normal operation, the usage bit selection signal contains data 1 to N (N-bit transmission data). The transmission data selection signal is transmitted to the data selection circuits 55-1 to 55-N.

Furthermore, data 1 to N/2 is transmitted to the signal lines 1 to N/2, and data N/2+1 to N is transmitted to the signal line N/2+1 to N. At the time of phase readjustment, the transmission data selection signal is not transmitted to data 1 to N, and a training pattern is transmitted to the signal lines 1 to N.

Figure 7:
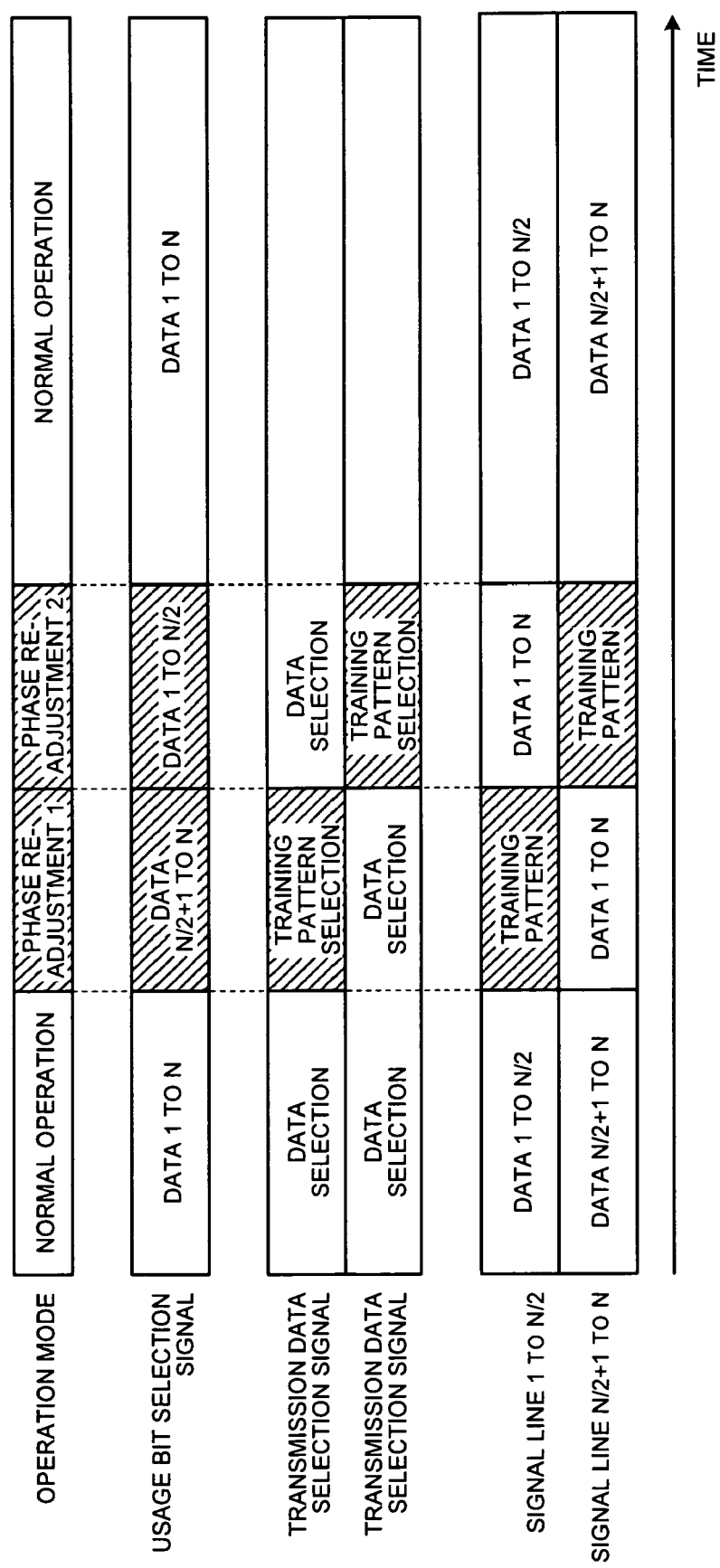
FIG. 7 is a schematic diagram illustrating the state of various signals and the state of data lines 1 to N at the time of normal operation and phase adjustment according to the embodiment.

FIG. 7 is a schematic diagram illustrating the state of various signals and the state of data lines 1 to N at the time of normal operation and phase adjustment according to the embodiment. As illustrated in FIG. 7, at the time of normal operation, in the transmission LSI 100 according to the embodiment, a usage bit selection signal contains data 1 to N (N-bit transmission data).

Furthermore, the transmission data selection signal is transmitted to the data selection circuits 106-1 to 106-N. Furthermore, data 1 to N/2 is transmitted to the signal lines 1 to N/2, and data N/2+1 to N is transmitted to the signal lines N/2+1 to N.

When a phase readjustment 1 is performed, the usage bit selection signal contains the data N/2+1 to N, and the transmission data selection signal is transmitted to the data selection circuits 106-N/2+1 to 106-N. Then, a training pattern is transmitted to the signal lines 1 to N/2, and the data 1 to N is transmitted to the signal lines N/2+1 to N.

When a phase readjustment 2 is performed, the usage bit selection signal contains the data 1 to N/2, and the transmission data selection signal is transmitted to the data selection circuits 106-1 to 106-N/2. Then, a training pattern is transmitted to the signal lines N/2+1 to N, and the data 1 to N is transmitted to the signal lines 1 to N/2.

As described above, when a phase adjustment is performed during the data transfer, the transmission LSI 100 and the receiving LSI 200 according to the embodiment temporarily use some of the N signal lines for the phase adjustment and use the rest of the signal lines for the data transfer. Accordingly, it is possible to maintain the optimum phase of a clock without delaying the data transfer.

Figure 12:
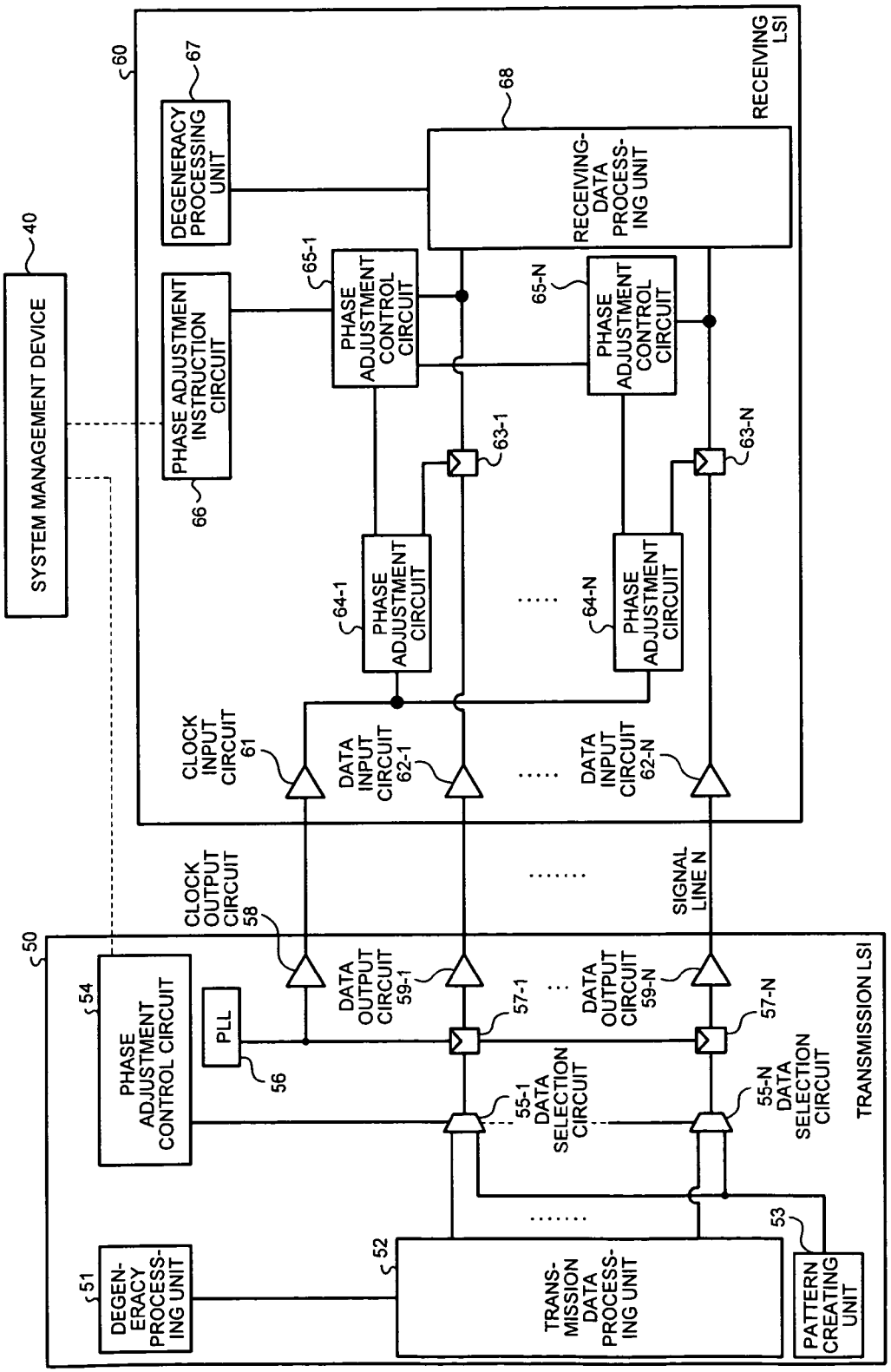
FIG. 12 is a schematic diagram illustrating the configuration of the conventional transmission LSI and the receiving LSI.

In a similar manner as in the transmission LSI 50 and the receiving LSI 60 illustrated in FIG. 12, by arranging a degeneracy processing unit, the transmission LSI 100 and the receiving LSI 200 can also perform a degeneracy process when a failure occurs in a signal line.

Figure 8:
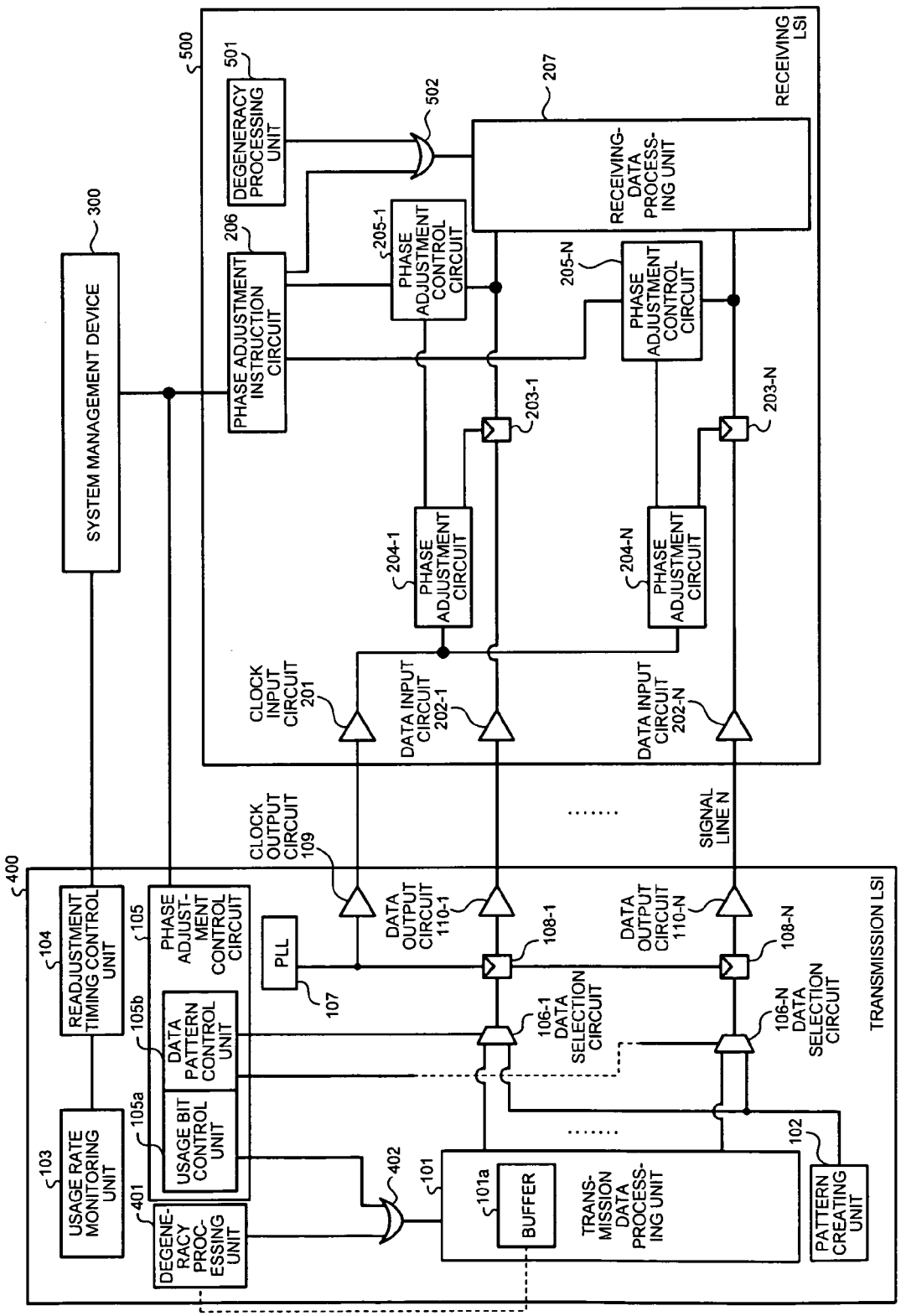
FIG. 8 is a schematic diagram illustrating the configuration of another transmission LSI and receiving LSI.

FIG. 8 is a schematic diagram illustrating the configuration of a transmission LSI 400 and a receiving LSI 500. As illustrated in FIG. 8, in addition to functioning units in the transmission LSI 100, the transmission LSI 400 includes a degeneracy processing unit 401 and an OR circuit 402.

The degeneracy processing unit 401 monitors the signal lines 1 to N and outputs, to the OR circuit 402, a usage bit selection signal corresponding to a signal line in which a failure has not occurred. In accordance with a usage bit selection signal obtained from the degeneracy processing unit 401 and a usage bit selection signal obtained from the usage bit control unit 105a, the OR circuit 402 outputs, to the transmission data processing unit 101, a usage bit selection signal that corresponds to a signal line transmitting transmission data and that is selected from among the signal lines in which a failure has not occurred.

A degeneracy processing unit 501 monitors signal lines 1 to N and outputs, to an OR circuit 502, a usage bit signal corresponding to a signal line in which a failure has not occurred. In accordance with a usage bit selection signal obtained from the degeneracy processing unit 501 and a usage bit selection signal obtained from the phase adjustment instruction circuit 206, the OR circuit 502 outputs, to the receiving-data processing unit 207, a usage bit selection signal that corresponds to a signal line receiving transmission data and that is selected from among the signal lines in which a failure has not occurred.

In the embodiment described above, a case in which the phase of a clock is readjusted between a single transmission LSI and a single receiving LSI has been described as an example; however, the present invention is not limited thereto. For example, a plurality of transmission LSIs can also be connected to a single receiving LSI and the receiving LSI can also switch the data transmission destination for each signal line.

Figure 9:
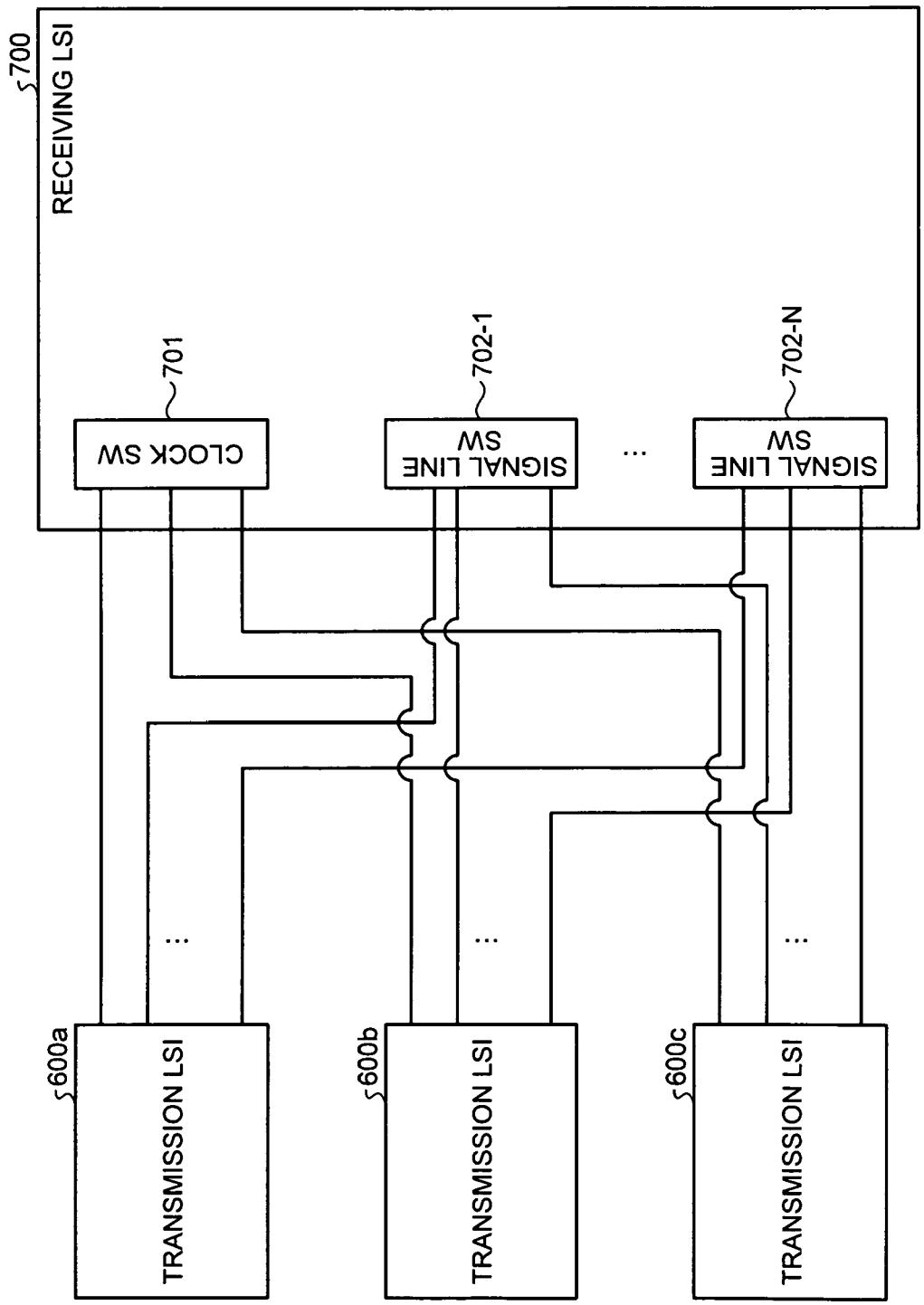
FIG. 9 is a schematic diagram illustrating the configuration of a system that has a plurality of transmission LSIs and a receiving LSI.
Figure 10:
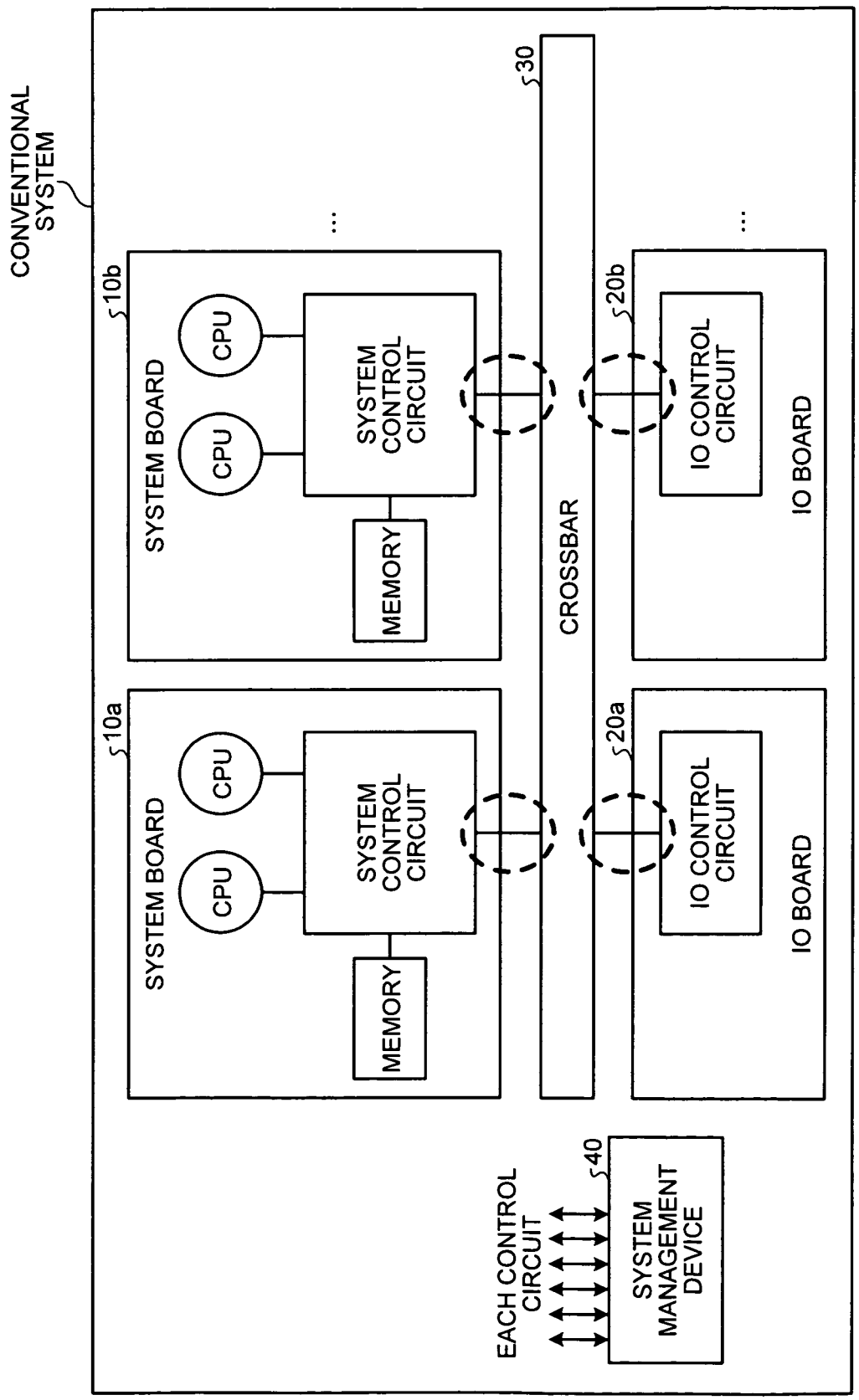
FIG. 10 is a schematic diagram illustrating the configuration of the conventional system.
Figure 11:
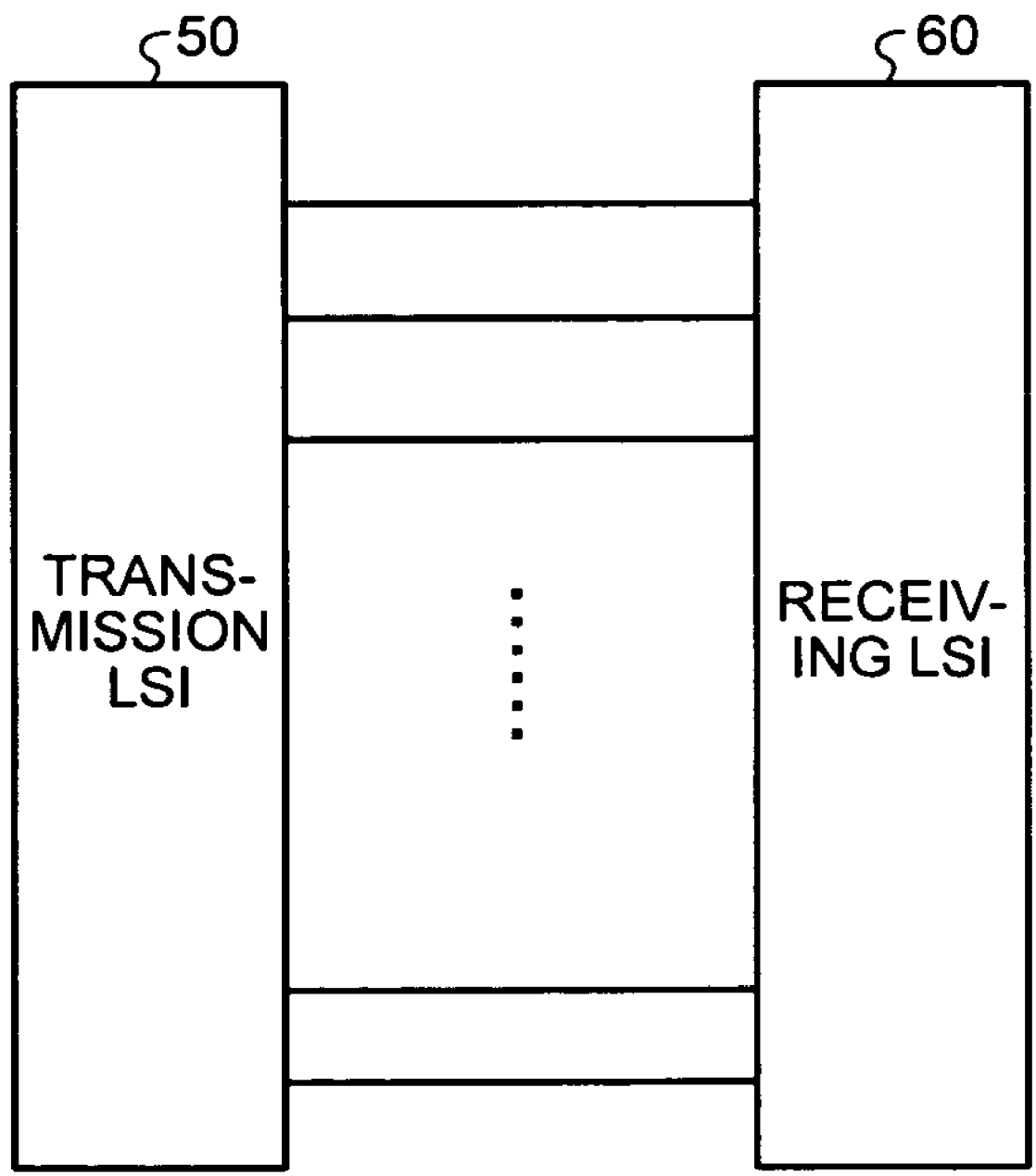
FIG. 11 is a schematic diagram illustrating the connection relation between the transmission LSI and the receiving LSI.

FIG. 9 is a schematic diagram illustrating, as an example, the configuration of a system that has a plurality of transmission LSIs and a receiving LSI. As illustrated in FIG. 9, transmission LSIs 600a to 600c are connected to a receiving LSI 700. The configuration of the transmission LSIs 600a to 600c is the same as that of the transmission LSI 100 illustrated in FIG. 2.

The receiving LSI 700 includes a clock SW 701 and signal line SWs 702-1 to 702-N. The other configuration thereof is the same as that of the receiving LSI 200 illustrated in FIG. 2. The clock SW 701 is a device that selects, from among the clocks transmitted from the transmission LSIs 600a to 600c, any one of the clocks and outputs the selected clock to the clock input circuit 201.

A signal line SW 702-j is a device that selects, in accordance with the clock SW 701, data that is sent from signal lines connected to the transmission LSIs 600a to 600c and outputs the selected data to the data input circuit 202-j. For example, if the clock SW 701 selects the clock in the transmission LSI 600a, the signal line SW 702-j selects data of the transmission LSI 600a and outputs it to the data input circuit 202-j.

Of the processes described in the embodiments, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise noted.

What is claimed is:

1. A data transfer unit comprising:
a data transmission device that transmits data via an N-bit transmission path (N is a positive integer); and
a data receiving device that receives the data via the transmission path, wherein
the data transmission device includes
a clock output unit that outputs a clock,
a transfer data creating unit that creates X-bit transmission data (X is a positive integer that satisfies N>X),
a phase-adjustment-data creating unit that creates (N−X)-bit phase adjustment data that adjusts, from among N transmission lines included in the N-bit transmission path, a phase between (N−X) transmission lines, and
a data output unit that outputs the X-bit transmission data and the (N−X)-bit phase adjustment data as N-bit data in accordance with an output of the clock; and
the data receiving device includes
a phase adjustment instruction unit that controls a phase adjustment of the data receiving device,
a clock input unit that inputs the clock and outputs a received clock,
a data input unit that inputs the N-bit data,
a transfer data holding unit that holds, from among the N-bit data that is input by the data input unit, the X-bit transmission data,
a phase-adjustment-data holding unit that holds, by using a phase adjusted clock, the (N−X)-bit phase adjustment data from among the N-bit data that is input by the data input unit,
a phase setting unit that outputs a phase setting value in accordance with the phase adjustment data held by the phase-adjustment-data holding unit and in accordance with a control performed by the phase adjustment instruction unit, and
a phase adjustment unit that inputs the received clock and the phase setting value and that outputs a phase adjusted clock in which a phase of the received clock is adjusted in accordance with the phase setting value.

2. The data transfer unit according to claim 1, wherein the data transmission device further includes
a buffer unit that stores therein the transmission data created by the transfer data creating unit,
a usage rate monitoring unit that monitors a buffer usage rate that is a ratio of the number of entries held by the buffer unit to the number of entries in which the transmission data is stored in the buffer unit, and
a usage bit control unit that changes, in accordance with the buffer usage rate, a bit ratio of the X-bit transmission data and the (N−X)-bit phase adjustment data that are output by the data output unit.

3. The data transfer unit according to claim 1, wherein the data transmission device further includes a clock unit that measures a minimum data transfer period that is the minimum period during which the data output unit outputs the transmission data and that measures a maximum phase adjustment period that is a maximum interval during which the data output unit outputs the phase adjustment data, and
the data output unit outputs the phase adjustment data in accordance with the minimum data transfer period and the maximum phase adjustment period.

4. The data transfer unit according to claim 1, further comprising a system control device that instructs the phase adjustment instruction unit to perform the phase adjustment.

5. A data transmission device that is connected to a data receiving device for receiving data and that transmits the data via an N-bit transmission path (N is a positive integer), the data transmission device comprising:
a clock output unit that outputs a clock;
a transfer data creating unit that creates X-bit transmission data (X is a positive integer that satisfies N>X);
a phase-adjustment-data creating unit that creates (N−X)-bit phase adjustment data that adjusts, from among N transmission lines included in the N-bit transmission path, a phase between (N−X) transmission lines; and
a data output unit that outputs the X-bit transmission data and the (N−X)-bit phase adjustment data as N-bit data in accordance with an output of the clock.

6. The data transmission device according to claim 5, further includes a buffer unit that stores therein the transmission data created by the transfer data creating unit, a usage rate monitoring unit that monitors a buffer usage rate that is a ratio of the number of entries held by the buffer unit to the number of entries in which the transmission data is stored in the buffer unit, and a usage bit control unit that changes, in accordance with the buffer usage rate, a bit ratio of the X-bit transmission data and the (N−X)-bit phase adjustment data that are output by the data output unit.

7. The data transmission device according to claim 5, further includes a clock unit that measures a minimum data transfer period that is the minimum period during which the data output unit outputs the transmission data and that measures a maximum phase adjustment period that is a maximum interval during which the data output unit outputs the phase adjustment data, and the data output unit outputs the phase adjustment data in accordance with the minimum data transfer period and the maximum phase adjustment period.

8. A control method performed by a data transfer unit that includes a data transmission device for transmitting data via an N-bit transmission path (N is a positive integer) and that includes a data receiving device for receiving the data via the transmission path, the control method comprising:

outputting, by a clock output unit included in the data transmission device, a clock;

creating, by a transfer data creating unit included in the data transmission device, X-bit transmission data (X is a positive integer that satisfies N>X);

creating, by a phase-adjustment-data creating unit included in the data transmission device, (N−X)-bit phase adjustment data that adjusts a phase between (N−X) transmission lines from among N transmission lines included in the N-bit transmission path;

outputting, by a data output unit included in the data transmission device, the X-bit transmission data and the (N−X)-bit phase adjustment data as N-bit data in accordance with an output of the clock;

controlling, by a phase adjustment instruction unit included in the data receiving device, a phase adjustment of the data receiving device;

inputting, by a clock input unit included in the data receiving device, the clock and outputting a received clock;

inputting, by a data input unit included in the data receiving device, the N-bit data;

holding, by a transfer data holding unit included in the data receiving device, the X-bit transmission data from among the N-bit data that is input by the data input unit;

holding, using a phase adjusted clock by a phase-adjustment-data holding unit included in the data receiving device, the (N−X)-bit phase adjustment data from among the N-bit data that is input by the data input unit;

outputting, by a phase setting unit included in the data receiving device, a phase setting value in accordance with the phase adjustment data held by the phase-adjustment-data holding unit and in accordance with a control performed by the phase adjustment instruction unit; and inputting, by a phase adjustment unit included in the data receiving device, the received clock and the phase setting value, and outputting a phase adjusted clock in which a phase of the received clock is adjusted in accordance with the phase setting value.

\* \* \* \* \*